United States Patent
Ralli et al.

(10) Patent No.: US 7,717,564 B2
(45) Date of Patent: May 18, 2010

(54) PROJECTION SYSTEM INCLUDING INTRINSIC POLARIZER

(75) Inventors: Philip J. Ralli, Sudbury, MA (US); Pradnya V. Nagarkar, Newton, MA (US); James N. Gordon, Newton, MA (US); Ikuko Ebihara, St. Paul, MN (US); Charles L. Bruzzone, Woodbury, MN (US); Giorgio B. Trapani, Cambridge, MA (US)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 12/124,505

(22) Filed: May 21, 2008

(65) Prior Publication Data
US 2008/0218698 A1   Sep. 11, 2008

Related U.S. Application Data

(62) Division of application No. 11/131,796, filed on May 18, 2005, now Pat. No. 7,391,569.

(51) Int. Cl.
*G03B 21/14* (2006.01)
*G02F 1/1335* (2006.01)
*G02B 5/30* (2006.01)
*G02B 27/10* (2006.01)
*G02B 27/28* (2006.01)

(52) U.S. Cl. ............ 353/20; 349/9; 359/490; 359/492; 359/618

(58) Field of Classification Search ............ 353/20
See application file for complete search history.

(56) References Cited

U.S. PATENT DOCUMENTS

| | | | |
|---|---|---|---|
| 5,426,166 A | 6/1995 | Usifer et al. | 526/301 |
| 5,629,358 A | 5/1997 | Nagahata et al. | 522/84 |
| 5,666,223 A | 9/1997 | Bennett et al. | 359/490 |
| 5,812,317 A | 9/1998 | Billingsley et al. | 359/536 |
| 5,973,834 A | 10/1999 | Kadaba et al. | 359/490 |
| 6,088,067 A | 7/2000 | Willett et al. | 349/5 |
| 6,217,174 B1 | 4/2001 | Knox | 353/31 |
| 6,337,118 B1 | 1/2002 | Takehana et al. | 428/64.1 |
| 6,376,571 B1 | 4/2002 | Chawla et al. | 522/64 |
| 6,377,724 B1 | 4/2002 | Bookbinder et al. | 385/16 |
| 6,481,850 B1 * | 11/2002 | Takezawa et al. | 353/20 |
| 6,514,584 B1 | 2/2003 | Merlin et al. | 428/36.7 |
| 6,524,759 B1 | 2/2003 | Sugimoto et al. | 430/20 |
| 6,548,176 B1 | 4/2003 | Gwo | 428/420 |
| 6,549,335 B1 * | 4/2003 | Trapani et al. | 359/490 |
| 6,552,849 B1 | 4/2003 | Furuhashi et al. | 359/491 |
| 6,562,881 B2 | 5/2003 | Jacobine et al. | 522/96 |
| 6,596,787 B1 | 7/2003 | Levandoski et al. | 522/96 |

(Continued)

FOREIGN PATENT DOCUMENTS

EP   0 727 471   8/1996

(Continued)

*Primary Examiner*—Melissa J Koval
(74) *Attorney, Agent, or Firm*—Oliff & Berridge, PLC

(57) ABSTRACT

A projection system includes a light source producing illumination light, an imager disposed to receive the illumination light, and a projection lens disposed to receive the illumination light from the imager. The imager includes an intrinsic polarizer. The intrinsic polarizer can be an intrinsic polarizer stack including a U.V. curable adhesive.

3 Claims, 2 Drawing Sheets

U.S. PATENT DOCUMENTS

| | | | |
|---|---|---|---|
| 6,630,970 B2 | 10/2003 | Trapani et al. | 349/96 |
| 6,646,806 B1 * | 11/2003 | Bierhuizen | 359/618 |
| 6,803,972 B1 | 10/2004 | Budd et al. | 349/9 |
| 6,808,657 B2 | 10/2004 | Fansler et al. | 264/1.34 |
| 6,814,899 B2 | 11/2004 | Cael et al. | 264/1.34 |
| 7,251,075 B2 | 7/2007 | Trapani et al. | 359/492 |
| 2001/0036013 A1 | 11/2001 | Allen et al. | 359/599 |
| 2002/0149852 A1 | 10/2002 | Dubinovsky et al. | 359/618 |
| 2003/0001987 A1 | 1/2003 | Trapani et al. | 349/96 |
| 2003/0002154 A1 | 1/2003 | Trapani et al. | 359/492 |
| 2003/0189264 A1 | 10/2003 | Jones et al. | 264/1.31 |
| 2003/0189275 A1 | 10/2003 | Cael et al. | 264/492 |
| 2003/0190491 A1 | 10/2003 | Jones et al. | 428/500 |
| 2004/0127594 A1 | 7/2004 | Yang et al. | 522/114 |
| 2004/0201829 A1 | 10/2004 | Eckhardt | 353/97 |
| 2004/0227994 A1 | 11/2004 | Ma et al. | 359/487 |
| 2004/0233393 A1 | 11/2004 | Magarill et al. | 353/33 |
| 2004/0234774 A1 | 11/2004 | Cheng et al. | 428/415 |
| 2004/0241480 A1 | 12/2004 | Fansler et al. | 264/1.34 |
| 2005/0275342 A1 * | 12/2005 | Yanagawa | 313/504 |

FOREIGN PATENT DOCUMENTS

| | | |
|---|---|---|
| EP | 1 291 704 | 3/2003 |
| JP | 2002-116502 | 4/2002 |
| WO | WO 00/75253 | 12/2000 |
| WO | WO 03/005112 | 1/2003 |
| WO | WO 2004/094510 | 11/2004 |

* cited by examiner

PROJECTION SYSTEM INCLUDING INTRINSIC POLARIZER

CROSS-REFERENCE

This application is a divisional of U.S. patent application Ser. No. 11/131,796, filed on May 18, 2005, now U.S. Pat. No. 7,391,569, the disclosure of which is incorporated by reference in its entirety herein.

BACKGROUND

This invention generally relates to projection systems including intrinsic polarizers. Specifically, the invention relates to transmissive or reflective projection systems including intrinsic polarizers.

Projection display systems usually include a source of light, illumination optics, an image-forming device, projection optics and a projection screen. The illumination optics collect light from a light source and direct it to one or more image-forming devices in a predetermined manner. The image-forming device(s), controlled by an electronically conditioned and processed video signal (typically digital), produces an image corresponding to the video signal. Projection optics then magnify the image and project it onto the projection screen. White light sources, such as arc lamps, in conjunction with color wheels have been used as light sources for projection display systems. However, recently, light emitting diodes (LEDs) were introduced as an alternative. Some advantages of LED light sources include longer lifetime, higher efficiency, superior thermal characteristics and better color gamut.

Examples of image-forming devices include liquid crystal panels, such as a liquid crystal on silicon device (LCOS). In liquid crystal panels, the alignment of the liquid crystal material is controlled incrementally (pixel-to-pixel) according to the data corresponding to a video signal. Depending on the alignment of the liquid crystal material, polarization of the incident light may be altered by the liquid crystal structure. Thus, with appropriate use of polarizers or polarizing beam splitters, dark and light regions may be created, which correspond to the input video data.

Another type of an image-forming device is a high temperature polysilicon liquid crystal device (HTPS-LCD). HTPS-LCD also includes a liquid crystal layer, in which the alignment can be controlled incrementally (pixel-to-pixel), as determined by the data corresponding to a video signal. The liquid crystal layer is sandwiched between two glass substrates, each with an array of transparent electrodes on them, thus being adapted for operation in transmission. Typically, at the corner of each HTPS-LCD pixel, there is a microscopic thin film transistor.

Current HTPS and LCOS based projection systems are enabled by the use dye-type polarizers. However, dye-type polarizers have limitations such as, for example, environmental instability, limited light transmission and/or degradation under high light flux.

SUMMARY

Generally, the present invention relates to improved projection systems including intrinsic polarizers. Specifically, the invention relates to transmissive or reflective projection systems including intrinsic polarizers.

In one illustrative embodiment, a projection system including an intrinsic polarizer is disclosed. The projection system includes a light source producing illumination light, an imager disposed to receive the illumination light, and a projection lens disposed to receive the illumination light from the imager. The imager includes an intrinsic polarizer. An intrinsic polarizer stack is also disclosed.

In another illustrative embodiment, a projection system includes a light source producing illumination light, an imager disposed to receive the illumination light, and a projection lens disposed to receive the illumination light from the imager. The imager includes an intrinsic polarizer disposed on a liquid crystal light modulator, a pressure sensitive adhesive disposed between the intrinsic polarizer and the liquid crystal light modulator, and a U.V curable adhesive disposed on the intrinsic polarizer.

In a further illustrative embodiment, a polarizer stack includes an intrinsic polarizer film, a substrate, and a U.V. cured adhesive disposed between the intrinsic polarizer film and the substrate. The U.V. cured adhesive includes a silane.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The invention may be more completely understood in consideration of the following detailed description of various embodiments of the invention in connection with the accompanying drawings, in which.

Figure 1:
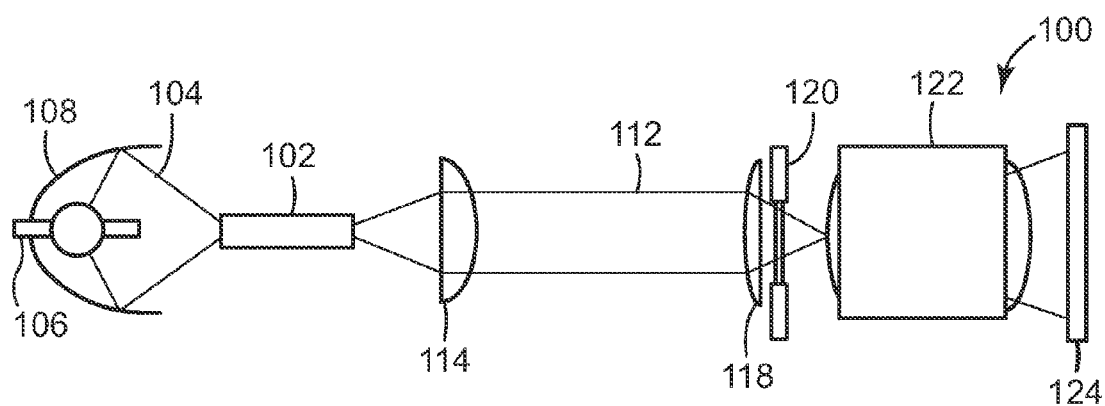
FIG. 1 schematically illustrates an embodiment of a transmissive projection system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable generally to projection systems including intrinsic polarizers. Specifically, the invention relates to transmissive or reflective projection systems including intrinsic polarizers. These examples, and the examples discussed below, provide an appreciation of the applicability of the disclosed projection systems, but should not be interpreted in a limiting sense.

The term "polymer" will be understood to include polymers, copolymers (e.g., polymers formed using two or more different monomers), oligomers and combinations thereof, as well as polymers, oligomers, or copolymers. Both block and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a silane" includes a mixture of two or more silanes. As used in this specification and the appended claims, the term "or" is generally employed in its sense including "and/or" unless the content clearly dictates otherwise.

Projection systems typically include a transmissive or a reflective imager, also referred to as a light valve or light valve array, which imposes an image on a light beam. Transmissive imagers can be translucent and allow light to pass through. Reflective imagers, on the other hand, reflect only selected portions of the input beam to form an image.

A single imager may be used for forming a monochromatic image or a color image. Multiple imagers (two, three, four, or more) can be used for forming a color image, where the illuminating light is split into multiple (two, three, four, or more) beams of different color. An image is imposed on each of the beams individually, which are then recombined to form a full color image.

FIG. 1 schematically illustrates an embodiment of a transmissive projection system 100. In one embodiment, illumination light 104 from a light source or lamp 106 is focused into a tunnel integrator 102. Illumination light 112 exiting the tunnel integrator 102 is collimated by a condensing lens 114 and then passes through an imager field lens 118, a transmissive imager 120 and a projection lens 122 to a screen 124. The transmissive imager 120 includes an intrinsic polarizer disposed within an optical path of the illumination light. One or more intrinsic polarizers can be disposed prior to and/or after the imager 120. The light source 106 may include, for example, a halogen lamp, a high pressure mercury arc lamp, a metal halide arc lamp, LED, or some other type of source for generating the illuminating light 104.

Figure 2:
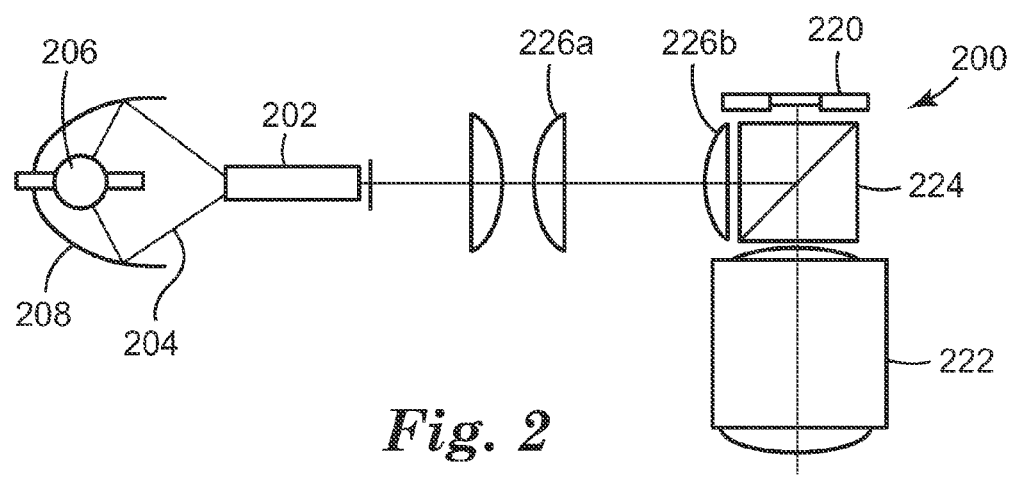
FIG. 2 schematically illustrates an embodiment of a reflective projection system.

FIG. 2 schematically illustrates an embodiment of a reflective projection system 200. The projection system 200 includes a light source 206 that directs illumination light 204 to a tunnel integrator 202 and to lenses 226a and 226b and is then transmitted via a polarizing beamsplitter 224 onto a reflective imager 220, to a projection lens 222, then to a screen (not shown.) The reflective imager 220 includes an intrinsic polarizer disposed within an optical path of the illumination light. One or more intrinsic polarizers can be disposed prior to and/or after the imager 220. The light source 206 may include, for example, a halogen lamp, a high pressure mercury arc lamp, a metal halide arc lamp, LED, or some other type of source for generating the illuminating light 204.

The imagers described herein include an intrinsic polarizer positioned within the optical path of illumination light. The intrinsic polarizer can be positioned before and/or after the imager and may be disposed adjacent to the imager. The term "adjacent" refers to an element being disposed on, or spaced away from the imager. In some embodiments, the intrinsic polarizer is adhered to the imager with an adhesive. In other embodiments, the intrinsic polarizer is spaced away from the imager with or without one or more layers of material.

Polarizers in the form of synthetic polarizing films exhibit comparative ease of manufacture and handling and comparative ease with which they may be incorporated into projection systems including imagers. In general, plane polarizing films have the property of selectively passing radiation vibrating along a given electromagnetic radiation vector and absorbing electromagnetic radiation vibrating along a second electromagnetic radiation vector based on the anisotropic character of the transmitting film medium. Plane polarizing films include dichroic polarizers, which are absorbing plane polarizers utilizing the vectorial anisotropy of their absorption of incident light waves. The term "dichroism" refers to the property of differential absorption of the components of incident light, depending on the vibration directions of the component light waves. Light entering a dichroic plane polarizing film encounters two different absorption coefficients along transverse planes, one coefficient being high and the other coefficient being low. Light emerging from a dichroic film vibrates predominantly in the plane characterized by the low absorption coefficient.

Dichroic plane polarizing films include H-type (iodine) polarizers and dyestuff polarizers. For example, an H-type polarizer is a synthetic dichroic sheet polarizer including a polyvinyl alcohol-iodine complex. Such a chemical complex is referred to as a chromophore. The base material of an H-type polarizer is a water-soluble high molecular weight substance, and the resulting film has relatively low moisture and heat resistance and tends to curl, peel or otherwise warp when exposed to ambient atmospheric conditions. Further, H-type polarizers are inherently unstable, and require protective cladding, e.g., layers of cellulose triacetate, on both sides of the polarizer to prevent degradation of the polarizer in a normal working environment such as in a liquid crystal display.

In contrast to H-type polarizers and other similar synthetic dichroic plane polarizers are intrinsic polarizers. Intrinsic polarizers polarize light due to the inherent chemical structure of the base material used to form the polarizer. Such intrinsic polarizers are also typically thin and durable. Examples of intrinsic polarizers are K-type polarizers.

A K-type polarizer is a synthetic dichroic plane polarizer based on molecularly oriented polyvinyl alcohol (PVA) sheets or films with a balanced concentration of light-absorbing chromophores. A K-type polarizer derives its dichroism from the light absorbing properties of its matrix, not from the light-absorbing properties of dye additives, stains, or suspended crystalline materials. Thus, a K-type polarizer may have both good polarizing efficiency and good heat and moisture resistance. A K-type polarizer may also be very neutral with respect to color.

An improved K-type polarizer, referred to as a KE polarizer, is manufactured by 3M Company, Norwood, Mass. The KE polarizer has improved polarizer stability under severe environmental conditions, such as high temperatures and high humidity. In contrast to H-type polarizers, in which the light absorption properties are due to the formation of a chromophore between PVA and tri-iodide ion, KE polarizers are made by chemically reacting the PVA by an acid catalyzed, thermal dehydration reaction. The resulting chromophore, referred to as polyvinylene, and the resulting polymer may be referred to as a block copolymer of vinyl alcohol and vinylene. Intrinsic polarizers are described in: U.S. Pat. No. 5,666,223; U.S. Pat. No. 5,973,834; U.S. Pat. No. 6,549,335;

U.S. Pat. No. 6,630,970; U.S. Pat. No. 6,808,657; U.S. Pat. No. 6,814,899; US2003/0189264; US2003/0189275; US2003/0190491; US2004/0241480, all of which are incorporated by reference herein.

For H-type polarizers, stability is generally achieved by sandwiching the polarizer between two plastic substrates, such as two layers of cellulose triacetate, one on each side of the polarizer. However, even in these structures the application of heat, humidity and/or vacuum can adversely affect the properties of the polarizer. In contrast, K-type polarizers such as KE polarizers do not need to be sandwiched between sheets of cellulose triacetate. The polyvinylene chromophore of the KE polarizer is a stable chemical entity, since the chromophore is intrinsic to the polymer molecule. This chromophore is thermally stable as well as resistant to attack from a wide range of solvents and chemicals, when integrated into a cross-linked polyvinyl alcohol matrix. A K-type polarizer such as a KE polarizer has several advantages over other types of polarizers currently used in projection systems, e.g., iodine and dyestuff polarizers. K-type polarizers have more durable chromophores, are thinner, and may be designed with variable transmission levels. Most notably, K-type polarizers such as KE polarizers may be used in applications that require high performance under severe environmental conditions, including high temperatures, high humidity and high flux (e.g., light intensity), such as, for example, 85 degrees Celsius and 85% relative humidity, for extended periods of time. Under such environmental conditions, the stability of H-type or iodine polarizers is greatly reduced, thus limiting their usefulness in applications such as projection systems. Due to the inherent chemical stability of K-type polarizers, a wide variety of adhesive formulations, including pressure sensitive adhesives, can be applied directly to K-type polarizers. Further, a single-sided plastic support is adequate to give physical support for K-type polarizers, and since this support can be located outside of the optical path of the liquid crystal display cell, it need not be optically isotropic and lower-cost substrates such as polyethylene terephthalate (PET) are acceptable alternatives. Moreover, the ability to construct single-sided laminates allows the optical structures to be thinner, allowing for additional flexibility in the design and manufacture of flat panel display elements. These advantages of K-type polarizers may be used in a wide variety of optical applications, including projection systems. Thus, it is believed that dichroic plane polarizing films include H-type (iodine) polarizers and dyestuff polarizers currently used in projection systems can be replaced with K or KE-type polarizers.

Some advantages of using K or KE polarizers in a projection system include:

1). Optics. KE polarizer can be produced with optics closely approximating iodine polarizers. However, when compared to dye-type polarizers of a given efficiency, KE polarizers may exhibit significantly enhanced transmission. Brightness is a factor in projection system design and the potential for enhanced transmission of light through the polarizer is a benefit.

2). Durability. KE polarizer maintains its optical properties when exposed to extremes of heat and humidity and does not suffer from the bleaching or browning typical of iodine or dye-type polarizers. KE polarizers used in projection optics will show negligible change with time and the brightness and contrast of the projected image will be maintained.

3). Structure. Due to the inherent durability of KE polarizers, the use of encapsulating substrates such as TAC is not required. In a projection system it is advantageous to eliminate as many organic layers as possible as they are subject to degradation under the high intensity illumination. Due to the inherent chemical stability of the KE polarizer it is expected that the material will be able to withstand a higher heat load than dye-containing materials.

Figure 3:
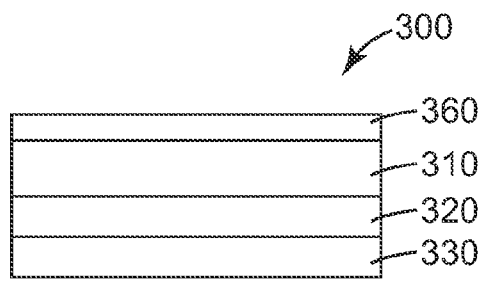
FIG. 3 schematically illustrates an embodiment of an intrinsic polarizer stack.

FIG. 3 schematically illustrates an embodiment of an intrinsic polarizer stack 300 useful in projection systems. An intrinsic polarizer 310 is shown disposed on a substrate 330 with an adhesive layer 320. An optional anti-reflective layer 360 is disposed on the intrinsic polarizer 310.

The intrinsic polarizer 310 can be a K or KE-type polarizer, as described above. The intrinsic polarizer 310 can have any useful thickness. In some embodiments, the intrinsic polarizer 310 has a thickness in a range from 5 to 100 micrometers, or 10 to 50 micrometers, or 20 to 40 micrometers.

The substrate 330 can be formed of any useful material. In some embodiments, the substrate 330 is formed of a polymeric material such as, for example, cellulose triacetate, polycarbonate, polyacrylate, polypropylene, or polyethylene terephthalate. In some embodiments, the substrate 330 is formed of an inorganic material such as, for example, quartz, glass, sapphire, YAG, or mica.

The substrate 330 can have any useful thickness. In some embodiments, the substrate 330 has a thickness in a range from 10 micrometers or greater, or 10 to 1000 micrometers, or 25 to 500 micrometers, or 50 to 250 micrometers. In other embodiments, the substrate 330 has a thickness in a range from 10 micrometers to 20 centimeters. In some embodiments, the substrate 330 is planar, in other embodiments, the substrate 330 is non-planar. In some embodiments, the substrate 330 has optical functionality such as retardation or wavelength selectivity.

In some embodiments, the substrate 330 is a release liner. The release liner 330 can be formed of any useful material such as, for example, polymers or paper and may include a release coat. Suitable materials for use in release coats include, but are not limited to, fluoropolymers, acrylics and silicones designed to facilitate the release of the release liner 330 from the adhesive 320.

The adhesive 320 can be formed of any useful material. In some embodiments, the adhesive 320 is formed of a urethane, epoxy, or acrylic material and can be curable. In one embodiment, the adhesive 320 is a U.V. curable adhesive that includes a silane.

In one embodiment, the adhesive 320 is a pressure sensitive adhesive. The pressure sensitive adhesive 320 can be formed of any useful material. In some embodiments, the pressure sensitive adhesive 320 is an acrylic pressure sensitive adhesive. A partial listing of useful acrylate pressure sensitive adhesives includes commercially available adhesives available from Soken Chemical Company, Japan, under the tradename Soken 2106, Soken 1885, Soken 2263 and Soken 2065.

The adhesive 320 can have any useful thickness. In some embodiments, the adhesive 320 has a thickness in a range from 1 to 100 micrometers, or 5 to 75 micrometers, or 10 to 50 micrometers, or 20 to 40 micrometers. In other embodiments, the adhesive 320 has a thickness in a range from 0.1 to 20 micrometers, or 1 to 15 micrometers, or 1 to 10 micrometers.

An optional anti-reflective coating 360 can be applied directly to the intrinsic polarizer 310. The anti-reflection coating 360 may include a plurality of polymer layers or inorganic layers. In some embodiments, the anti-reflection coating 360 has a thickness of less than 1 micrometer and is an inorganic material such as ITO or A-ITO. An anti-reflection coating 360 may also have one or more anti-reflection layers, with the layers having alternating high and low indices of refraction, because the optical performance of an anti-reflection film increases with the number of layers. Such a multilayer anti-reflection film preferably has a series of highly uniform polymer or inorganic layers formed by web coating, sputtering, e-beam, vapor deposition or combinations thereof. In some embodiments, an optional anti-reflective coating (not shown) can be applied to a surface of the substrate 330.

Figure 4:
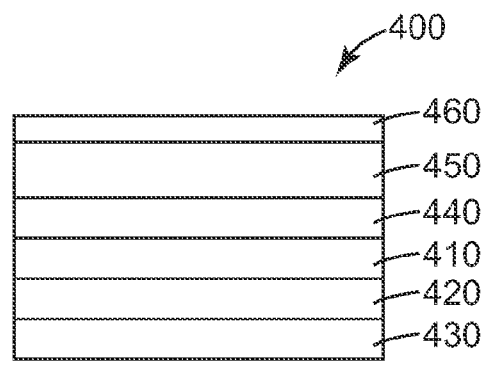
FIG. 4 schematically illustrates another embodiment of an intrinsic polarizer stack.

FIG. 4 schematically illustrates an embodiment of an intrinsic polarizer stack 400 useful in projection systems. An intrinsic polarizer 410 is shown disposed on a first substrate 450 with a first adhesive 440. A second adhesive 420 is disposed on an opposing side of the intrinsic polarizer 410 and between the intrinsic polarizer 410 and a second substrate 430. An optional anti-reflective coating 460 is disposed on the first substrate 450.

The intrinsic polarizer 410 can be a K or KE-type polarizer, as described above. The intrinsic polarizer 410 can have any useful thickness. In some embodiments, the intrinsic polarizer 410 has a thickness in a range from 5 to 100 micrometers, or 10 to 50 micrometers, or 20 to 40 micrometers.

The first substrate 450 can be formed of any useful material. In some embodiments, the first substrate 450 is formed of a polymeric material such as, for example, cellulose triacetate, polycarbonate, polyacrylate, polypropylene, or polyethylene terephthalate. In other embodiments, the first substrate 450 is formed of an inorganic material such as, for example, quartz, glass, sapphire, YAG, or mica.

The first substrate 450 can have any useful thickness. In some embodiments, the first substrate 450 has a thickness in a range from 10 micrometers or greater, or 10 to 1000 micrometers, or 25 to 500 micrometers, or 50 to 250 micrometers. In other embodiments, the first substrate 450 has a thickness in a range from 10 micrometers to 20 centimeters. In some embodiments, the first substrate 450 is planer, in other embodiments, the first substrate 450 is non-planar. In some embodiments, the first substrate 450 has optical functionality such as retardation or wavelength selectivity.

The second substrate 430 can be formed of any useful material. In some embodiments, the second substrate 430 is formed of a polymeric material such as, for example, cellulose triacetate, polycarbonate, polyacrylate, polypropylene, or polyethylene terephthalate. In other embodiments, the second substrate 430 is formed of an inorganic material such as, for example, quartz, glass, sapphire, YAG, or mica.

The second substrate 430 can have any useful thickness. In some embodiments, the second substrate 430 has a thickness in a range from 10 micrometers or greater, or 10 to 1000 micrometers, or 25 to 500 micrometers, or 50 to 250 micrometers. In other embodiments, the second substrate 430 has a thickness in a range from 10 micrometers to 20 centimeters. In some embodiments, the second substrate 430 is planar, in other embodiments, the second substrate 430 is non-planar. In some embodiments, the second substrate 430 has optical functionality such as retardation or wavelength selectivity.

In some embodiments, the second substrate 430 is a release liner. The release liner 430 can be formed of any useful material such as, for example, polymers or paper and may include a release coat. Suitable materials for use in release coats include, but are not limited to, fluoropolymers, acrylics and silicones designed to facilitate the release of the release liner 430 from the second adhesive 420.

The first adhesive 440 can be formed of any useful material. In some embodiments, the first adhesive 440 is formed of a urethane, epoxy, or acrylic material and can be curable.

In one embodiment, the first adhesive 440 is a U.V. curable adhesive that includes a silane. A partial listing of useful U.V. curable adhesives includes: isocyanate based adhesives such as Araldite 2026A/B available from Huntsman Advanced Materials, Belgium; urethane based adhesives such as Loctite™ U-09LV, U-09FL, U-10FL available from Henkel Loctite Corp., Connecticut and OP-44 available from Dymax Corp., Torrington, Conn.; epoxy based adhesives such as Hysol E-30CL, Hysol E-05CL available from Henkel Loctite Corp., Connecticut. In one embodiment, the silane is N-beta-(aminoethyl)-gamma-aminopropyltriethoxysilane, known as Silquest™ A-1120 silane available from GE Silicones, WV. The silane can be added to the adhesive at any useful ratio of adhesive:silane such as, for example, 100:1 to 10:1 ratio by wt %.

In another embodiment, the first adhesive 440 is a pressure sensitive adhesive. The pressure sensitive adhesive can be formed of any useful material. In some embodiments, the pressure sensitive adhesive is an acrylic pressure sensitive adhesive. A partial listing of useful acrylate pressure sensitive adhesives includes commercially available adhesives available from Soken Chemical Company, Japan, under the tradename Soken 2106, Soken 1885, Soken 2263 and Soken 2065.

The first adhesive 440 can have any useful thickness. In some embodiments, the first adhesive 440 has a thickness in a range from 0.1 to 20 micrometers, or 1 to 15 micrometers, or 1 to 10 micrometers.

The second adhesive 420 can be formed of any useful material. In some embodiments, the second adhesive 420 is formed of an acrylic material. In some embodiments, the second adhesive 420 is an acrylic pressure sensitive adhesive. A partial listing of useful acrylate pressure sensitive adhesives includes commercially available adhesives available from Soken Chemical Company, Japan, under the tradename Soken 2106, Soken 1885, Soken 2263 and Soken 2065. The second adhesive 420 can have any useful thickness. In some embodiments, the second adhesive 420 has a thickness in a range from 1 to 100 micrometers, or 10 to 75 micrometers, or 20 to 40 micrometers.

An optional anti-reflective coating 460 can be applied to the first substrate 450. The anti-reflection coating 460 may include a plurality of polymer layers or inorganic layers. In some embodiments, the anti-reflection coating 460 has a thickness of less than 1 micrometer and is an inorganic material such as ITO or A-ITO. An anti-reflection coating 460 may also have one or more anti-reflection layers, with the layers having alternating high and low indices of refraction, because the optical performance of an anti-reflection film increases with the number of layers. Such a multilayer anti-reflection film preferably has a series of highly uniform polymer or inorganic layers formed by web coating, sputtering, e-beam, vapor deposition or combinations thereof. In some embodiments, an optional anti-reflective coating (not shown) can be applied to a surface of the first substrate 450 and/or second substrate 430. The optional anti-reflective coating can be applied to any surface that interfaces with air in order to reduce undesirable reflections.

Figure 5:
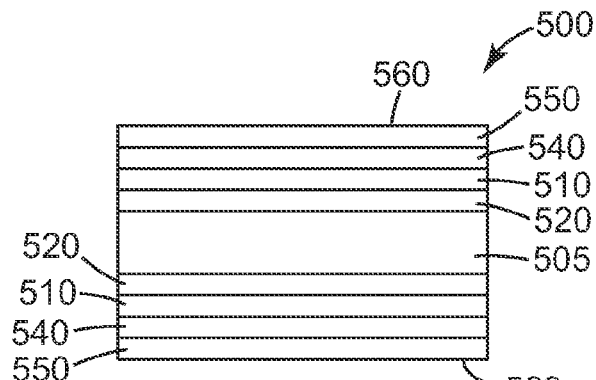
FIG. 5 schematically illustrates an embodiment of a transmissive imager.

FIG. 5 schematically illustrates an embodiment of a transmissive imager 500. A liquid crystal cell 505 is shown between two intrinsic polarizers 510. The intrinsic polarizers 510 can be separated from the liquid crystal cell 505 by one or more layers or be spaced away from the liquid crystal cell 505. In the embodiment shown in FIG. 5, a second adhesive layer 520 is disposed between the liquid crystal cell 505 and the intrinsic polarizer 510. A first substrate 550 is bonded to the intrinsic polarizer 510 with a first adhesive layer 540. An optional anti-reflective coating 560 can be applied to the second substrate 550. The intrinsic polarizer 510, second adhesive layer 520, first substrate 550, first adhesive layer 540, and anti-reflection coating 560 are all described above with FIG. 4. In one embodiment, the imager 500 includes, a K or KE polarizer 510, a pressure sensitive adhesive layer 520, an unhydrolyzed cellulose triacetate substrate 550, and a U.V. curable adhesive 540.

Figure 6:
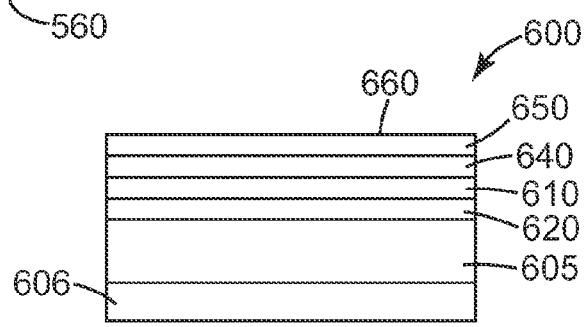
FIG. 6 schematically illustrates an embodiment of a reflective imager.

FIG. 6 schematically illustrates an embodiment of a reflective imager 600. A liquid crystal cell 605 is shown between an intrinsic polarizer 610 and a reflective mirror 606. The intrinsic polarizer 610 and the reflective mirror 606 can be separated from the liquid crystal cell 605 by one or more layers or be spaced away from the liquid crystal cell 605. In the embodiment shown in FIG. 6, a second adhesive layer 620 is disposed between the liquid crystal cell 605 and the intrinsic polarizer 610. A first substrate 650 is bonded to the intrinsic polarizer 610 with a first adhesive layer 640. An optional anti-reflective coating 660 can be applied to the first substrate 650. The intrinsic polarizer 610, second adhesive layer 620, second substrate 650, the first adhesive layer 640, and anti-reflection coating 660 are all described above with FIG. 4. In one embodiment, the imager 600 includes, a K or KE polarizer 610, a pressure sensitive adhesive layer 620, an unhydrolyzed cellulose triacetate substrate 650, and a U.V. curable adhesive 640.

Further Discussion

Polarizer films used in projection system imagers can be laminated on both sides to cellulose triacetate substrates using various formulations of aqueous polyvinyl alcohol (PVA) adhesive ("dopes"). Hydrolysis of the triacetate surface has been required to provide good adhesion to the aqueous PVA adhesive, where the chemical hydrolysis of the triacetate surface generally increases adhesion to the PVA adhesive. This construction can then be laminated directly to glass, or to other plastic films and then to glass, using pressure sensitive adhesives, or other thermoplastic adhesive formulations. Polyvinylene polarizer films can also be used in similar constructions.

These constructions are often not physically or optically durable at either high temperature, high temperature/high humidity, or under intense light exposure, because: a) the highly oriented polarizer tends to shrink which causes unacceptable defects such as bubbling, delamination, or stress lines, or b) the polarizer and/or associated adhesives fade or darken under intense light exposure. In addition, the hydrolysis of triacetate is costly and tends to introduce several types of defects into optical stacks.

Liquid ultraviolet (UV) cured adhesive formulations, described herein, can be used to replace the aqueous dope fluids mentioned above. These can be used on one or both sides of the polarizer to bond it to various plastic substrates, even non-hydrolyzed triacetate. The disclosed U.V. cured adhesive formulations adhere well to non-hydrolyzed triacetate, eliminating the need for a triacetate hydrolysis process step. Constructions can be obtained which when laminated to glass, physically survive severe conditions of temperature, humidity, and or light exposure. In many embodiments, silane adhesion promoters are useful to increase adhesion of the adhesive to both the polarizer and triacetate substrates.

In some embodiments, the substrate 330, 450, 430 described herein is a cellulose triacetate material having a hydrolyzed or non-hydrolyzed surface. In one embodiment, the substrate 330, 450, 430 is cellulose triacetate with a non-hydrolyzed surface. The disclosed U.V. cured adhesive formulations adhere well to non-hydrolyzed triacetate, eliminating the need for a triacetate hydrolysis process step.

A partial listing of useful U.V. curable adhesives useful in the described adhesive layers 320, 440, 420 includes: isocyanate based adhesives; urethane based adhesives such as Araldite 2026A/B available from Huntsman Advanced Materials, Belgium, Loctite™ U-09LV, U-09FL, U-10FL available from Henkel Loctite Corp., Connecticut and OP-44 available from Dymax Corp., Torrington, Conn.; epoxy based adhesives such as Hysol E-30CL, Hysol E-05CL available from Henkel Loctite Corp., Connecticut; urethane acrylate based adhesives such as Loctite™ 3104, 3105, 3107 available from Henkel Loctite Corp., Connecticut; and/or acrylate based adhesives such as Loctite™ 3491 available from Henkel Loctite Corp., Connecticut. In one embodiment, the silane is N-beta-(aminoethyl)-gamma-aminopropyltriethoxysilane, known as Silquest™ A-1120 silane available from GE Silicones, WV. The silane can be added to the adhesive at any useful ratio of adhesive:silane such as, for example, 100:1 to 10:1 ratio by wt %.

With regard to FIG. 4, an optional anti-reflective coating 470 can be applied to the second substrate 430. The anti-reflection coating 470 may include a plurality of polymer layers or inorganic layers. In some embodiments, the anti-reflection coating 470 has a thickness of less than 1 micrometer and is an inorganic material such as ITO or A-ITO. An anti-reflection coating 470 may also have one or more anti-reflection layers, with the layers having alternating high and low indices of refraction, because the optical performance of an anti-reflection film increases with the number of layers. Such a multilayer anti-reflection film preferably has a series of highly uniform polymer or inorganic layers formed by web coating, sputtering, e-beam, vapor deposition or combinations thereof.

The anti-reflective coatings described herein can be applied to optical elements or polarizer stacks at any air interface. The anti-reflective coatings described herein can be broad band or narrow band anti-reflective coatings. Broad band anti-reflective coatings can be effective over at least a majority of the visual spectrum (400-750 nm). Narrow band anti-reflective coatings can be effective over generally one color band of the visual spectrum (e.g., 400-500 nm, 500-600 nm, or 600-750 nm). In some embodiments, a narrow band anti-reflective coating is utilized in the polarizer stacks described herein.

FIG. 3 illustrates an asymmetric polarizer stack 300 and FIG. 4 illustrates a symmetric polarizer stack 400. In many embodiments, the dual substrate symmetric polarizer stack 400 exhibits less curling than the single substrate asymmetric polarizer stack 300. However, when the substrates in both polarizer stacks (300, 400) are cellulose triacetate (TAC) the dual substrate symmetric polarizer stack 400 can exhibit more yellowing under high intensity light flux, than the single substrate asymmetric polarizer stack 300. Thus, when utilizing TAC as a substrate, the amount of possible yellowing must be balanced with the physical integrity of the polarizer stacks (300, 400).

Advantages of the invention are illustrated by the following examples. However, the particular materials and amounts thereof recited in these examples, as well as other conditions and details, are to be interpreted to apply broadly in the art and should not be construed to unduly limit the invention.

EXAMPLES

Materials

Substrates:

TAC refers to cellulose triacetate, available from Eastman Kodak, Fuji Film, Lofo, or Island Polymers Industry.

Polarizer:

KE A refers to a KE (7.5x stretch) intrinsic polarizer laminated to TAC film. A cellulose triacetate (TAC) film and KE-polarizer (20-40 micrometer thickness) were laminated together with a curable adhesive (Boscodure 21 available from Bostik Findley, Wauwatosa, Wis.) disposed between them. A PSA adhesive was then applied onto the opposite side of the KE-polarizer by laminating a release film, pre-coated with PSA (Soken 2106), onto the KE-polarizer. The release film was removed and the exposed PSA was laminated to a glass slide.

KE B refers to a KE (7.5x stretch) intrinsic polarizer adhered to TAC film. A cellulose triacetate (TAC) film and KE-polarizer were laminated together with a curable adhesive (Boscodure 21:Vital 3554 in a 4:1 ratio by wt %, both available from Bostik Findley, Wauwatosa, Wis.) disposed between them. A PSA adhesive was then applied onto the opposite side of the KE-polarizer by laminating a release film, pre-coated with PSA (Soken 2106), onto the KE-polarizer. The release film was removed and the exposed PSA was laminated to a glass slide.

SHC125U refers to a high contrast dye-stuff polarizer available from Polatechno Co., Ltd. Japan.

dependent transmittance measurements made using a Hunterlab Ultrascan XE spectrophotometer. The hue of the transmitted light was subsequently calculated, using a D65 illuminant and is listed in the Table below. Color, or hue, is presented according to the CIELAB color system, which uses co-ordinates: a* and b*. The a* co-ordinate represents red/green color and the b* co-ordinate represents yellow/blue color. A positive value of a* corresponds to red and a negative value of a* corresponds to green. A positive value of b* corresponds to yellow and a negative value of b* corresponds to blue. The (a*, b*) co-ordinate of (0, 0) represents a neutral hue. Furthermore, a value of a* or b* whose magnitude is less than 1 results in a barely perceptible change in color from neutral. The Y value is the photopically corrected light transmittance and a decrease in Y represents a darkening in the sample.

Results:

The results are tabulated below in Table 1. Both KE samples exhibited negligible change in a total of 15 minutes of exposure whereas both dyestuff samples, including the projection polarizer, showed significant darkening after 5 minutes of exposure. The SHC125U dyestuff polarizer was subjected to a further 5 minutes of exposure and exhibited a radical change in transmission and color after that period.

TABLE 1

| Material | Initial | | | Final | | | Delta | | | Exposure Time |
|---|---|---|---|---|---|---|---|---|---|---|
| | Y | a* | b* | Y | A* | b* | Y | a* | B* | |
| KE A | 42.09 | 0.26 | 3.67 | 42.09 | 0.42 | 3.63 | 0 | 0.16 | −0.04 | 15 min |
| KE B | 42.02 | 0.18 | 3.8 | 41.12 | 0.41 | 4.23 | −0.90 | 0.23 | 0.43 | 15 min |
| SHC125U | 39.92 | −0.17 | 3.42 | 36.12 | 0.36 | 1.58 | −3.80 | 0.53 | −1.84 | 5 min |
| Proj-R | 39.95 | −1.13 | 3.85 | 35.36 | −2.31 | 1.90 | −4.59 | −1.18 | −1.94 | 5 min |

Proj-R refers to a red channel analyzer assembly from 3M MP7740i projector.

Example 1

Light and Heat Exposure Test

A 3M MP7740i office projector (having a 150 W UHB bulb) was disassembled so as to expose the light engine components. In order to demonstrate the enhanced durability of KE polarizer the condenser lens just after the polarization conversion system (PCS) was removed and the slot previously occupied by the lens was used as a mounting position for the testing of the polarizer assemblies described below.

Analysis of the PCS indicated that the light exiting the system was in the approximate ratio of 4:1 pass state to blocked state. The air temperature in the area of the projector just in front of the PCS was measured to be 110° C.

The polarizers were mounted such that the pass state was maximally transmitted when the slide assembly was mounted in the projector:

Test Procedure:

The projector was turned on and after a 30 second warm-up the polarizers were placed in the lens holder, with the polarizer side toward the incident light. The test structures were subjected to the intense light and heat in 5-minute increments.

The polarizers were characterized for spectral color and transmittance characteristics before and after each test.

Color Characteristics:

The color characteristics of each sample were calculated for light transmitted through the stack using the wavelength Example 2

An intrinsic polarizer stack suitable for use in a projection system was made from the following materials.

An anti-reflection coated, 80 micrometer thick cellulose triacetate (TAC) film and a 20-40 micrometer thick, 7.5x stretch, KE polarizer film manufactured by 3M was laminated together with a UV curable adhesive, including a silane adhesion promoter, disposed between them. The laminated stack was cured using Fusion D bulbs and the resulting thickness of the cured UV adhesive layer was between 2-6 micrometers. A PET release film with a layer of acrylic PSA disposed on the surface (such as UV10 available from CP Films, Martinsville, Va.) was then applied to the side of the KE polarizer film opposite the TAC film. The PET release film was removed and the exposed PSA was laminated to a quartz substrate.

Example 3

A retarder plus polarizer stack suitable for use in a projection system can be made from the following materials.

A 20-40 micrometer thick, 7.5x stretch, KE polarizer film manufactured by 3M can be disposed between an 80 micrometer thick cellulose triacetate (TAC) film and a ½ wave retarder film (available from Tejin Inds., Japan) and adhered together with an adhesive such as a UV curable, PSA or epoxy adhesive. The adhesive can be cured by the appropriate method. A PET release film with a layer of acrylic PSA disposed on the surface (such as UV10 available from CP Films, Martinsville, Va.) can be applied to either the TAC outer surface and/or the retarder film outer surface. The PET release film can be removed and the exposed PSA can be laminated to a quartz substrate.

Example 4

A polarizer stack suitable for use in a projection system can be made from the following materials.

A 20-40 micrometer thick, 7.5× stretch, KE polarizer film manufactured by 3M can be disposed between two glass, quartz, or sapphire substrates and adhered together with an adhesive such as a UV curable, PSA or epoxy adhesive. The adhesive can be cured by the appropriate method.

Example 5

In a full structure polarizer film stack, the adhesive used to bond the polarizer to the substrate should have high adhesion to both elements. If the bond strength to either element is low, the laminated construction will tend to delaminate during cutting, handling, and/or environmental testing. Liquid adhesive candidates were tested for adhesion to triacetate and K polarizer using the test procedure listed below. Various combinations of U.V. curable adhesives and silane adhesion promoters were screened by the procedures listed below. In a first set of tests (Example 5), U.V. adhesives without silane were compared for bond strength between unhydrolyzed triacetate and K polarizer. Results are shown in Table 2.

Test Procedure
a. Using two rubber laminating rollers, liquid UV adhesive candidates were laminated between an unhydrolyzed triacetate substrate and a K polarizer (resulting in the structure TAC/UV adhesive/K polarizer).
b. The constructions were cured through the K polarizer side on a Fusion UV curing unit (H bulb).
c. The samples were evaluated on an IMASS Slip/Peel Tester Model SP-2000 peel force tester by peeling (at 17 inch/min) the two substrates apart at 90 degree peel angle and measuring peel force in grams per inch (width of sample).

TABLE 2

| Adhesive | Peel Force (grams/inch) |
|---|---|
| Loctite 3104 | 30 |
| Loctite 3105 | 79 |
| Loctite 3107 | 42 |
| Loctite 3491 | 2 |
| Dymax OP44 | 86 |

Example 6

In the second set of tests (Example 6), four silanes were compared using Loctite 3105 as the base U.V. curable adhesive, for bond strength between unhydrolyzed triacetate and K polarizer as described in Example 5. Results are shown in Table 3.

TABLE 3

| Adhesive | Peel Force (grams/inch) |
|---|---|
| 25:1 3105:Silane A1120 | 830 |
| 25:1 3105:3-acryloxypropyl trimethoxysilane | 181 |
| 25:1 3105:3-(trimethoxysilyl)propyl acrylate | 137 |
| 25:1 3105:Silane A174 | 323 |

Example 7

In the third set of tests (Example 7), different U.V. adhesives were retested with Silane A1120 present, at two different ratios, for bond strength between unhydrolyzed triacetate and K polarizer as described in Example 5. Results are shown in Table 4.

TABLE 4

| Adhesive | Peel Force (grams/inch) 100:1 Ratio | Peel Force (grams/inch) 25:1 Ratio |
|---|---|---|
| Loctite 3104 | 73 | |
| Loctite 3105 | 390 | 904 |
| Loctite 3107 | 209 | 145 |
| Loctite 3491 | 65 | |
| Dymax OP44 | 132 | 46 |

Example 8

In the fourth set of tests (Example 8), various ratios of Loctite 3105 and Silane A1120 were evaluated with different curing conditions, for bond strength between unhydrolyzed triacetate and K polarizer as described in Example 5. Results are shown in Table 5.

TABLE 5

| Adhesive/Silane Ratio | U.V. Cure # or Passes | Peel Force (grams/inch) |
|---|---|---|
| 100:1 | 1 | 996 |
| | 2 | 350 |
| | 4 | 266 |
| 50:1 | 1 | 771 |
| | 2 | 538 |
| | 4 | 247 |
| 25:1 | 1 | 415 |
| | 2 | 823 |
| | 4 | 745 |
| 12.5:1 | 1 | 182 |
| | 2 | 973 |
| | 4 | 745 |

Example 9

The formulation of 25:1 Loctite 3105:Silane A1120, described above, was used to demonstrate the performance in both oven and projector testing, compared to a competitive projector polarizer structure. The following construction was made in the lab and tested in an oven and in an LCD projector:

| Layer | Description |
|---|---|
| Glass | |
| PSA | 1 mil thick layer of commercially available PSA (Soken 2106) |
| K polarizer | 28 micron thick polyvinylene polarizer |
| UV Adhesive | 5 micron thick layer of commercially available, 100% solids UV adhesive (Loctite 3105) mixed with Silane A1120 adhesion promoter, 25:1 ratio |
| TAC | 125 micron hardcoated LOFO TAC, hardcoat on side opposite adhesive, AR coating on hardcoat |

Oven Testing
1. Mixed Loctite 3105 with Silane A1120 (both 100% active) in 25:1 ratio.
2. Using two nipped rubber rollers, laminated K polarizer to the uncoated side of TAC which previously had been hard-coated and then coated with anti-reflection layers.
3. Transfer laminated Soken 2106 PSA (25 micron thickness) to the exposed K polarizer.
4. The PSA side of the construction was laminated between two nipped rubber rollers to standard glass microscope slides.
5. The polarizer/glass laminates transmittance were measured on a Cary 5E spectrophotometer. Included in the output from this measurement is the sample transmittance using plane polarized light which is perpendicular to the absorption axis of the polarizer ("pass" transmittance). This value is referred to as "k1" and is typically between 80% and 90% for samples of this type.
6. A sample was then placed in a 120° C. (dry) oven for 28 days, and then transmittance was re-measured. This resulted in a k1 loss of 3.2%. A comparative sample was also measured. This sample was a dyestuff polarizer (laminated to a quartz substrate) which was removed from the blue channel of a commercially available LCD projector. After 28 days at 120° C., the comparative sample had a k1 loss of 8.5%. Based on analysis of other similar samples, we believe the construction of this comparative sample to be the following construction:
quartz/PS/triacetate/dope adhesive/dyestuff polarizer/dope/triacetate/hardcoat/AR.

Projector Testing
1. Same as step 1 in oven testing.
2. Same as step 2 in oven testing.
3. Same as step 3 in oven testing.
4. Same as step 4 in oven testing, except used quartz substrate instead of glass.
5. Same as step 5 in oven testing. For this test, the important output is k2, which is the transmittance using plane polarized light which is parallel to the absorption axis of the polarizer ("cross" transmittance). Typical k2 values for these samples are 0.01-0.03%.
6. A sample was placed in the green entrance position of a commercially available LCD projector. The polarization conversion unit (which polarizes the light emitted by the illuminating bulb) was removed, resulting in greater light absorption and heating by the entrance polarizer. The effect of this change is to accelerate the failure of the polarizing element. K type samples were compared to the existing dyestuff green polarizer which comes with the projector, with the following shown in Table 6.

TABLE 6

| Sample | Projection Time | Result |
| --- | --- | --- |
| Comparative green | 2 days | Complete bleaching Catastrophic k2 increase |
| K-type | 2 days | k2 increase from 0.027% to 0.032% |
| K-type | 13 days | k2 increase from 0.027% to 0.038% |

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:
1. A projection system comprising:
a light source producing illumination light;
an imager disposed to receive the illumination light, the imager comprising:
an intrinsic polarizer disposed on a liquid crystal light modulator;
a pressure sensitive adhesive disposed between the intrinsic polarizer and the liquid crystal light modulator; and
a U.V. curable adhesive comprising a silane, disposed on the intrinsic polarizer;
a projection lens desposed to receive the illumination light from the imager.
2. A projection system according to claim 1, wherein the U.V. curable adhesive comprises a urethane acrylate based adhesive and the silane comprises N-beta-(aminoethyl)-gamma-aminopropyltriethoxysilane.
3. A projection system according to claim 1, further comprising an non-hydrolyzed triacetate substrate disposed on the U.V. curable adhesive.

* * * * *

UNITED STATES PATENT AND TRADEMARK OFFICE
CERTIFICATE OF CORRECTION

PATENT NO. : 7,717,564 B2  Page 1 of 1
APPLICATION NO. : 12/124505
DATED : May 18, 2010
INVENTOR(S) : Philip J. Ralli et al.

It is certified that error appears in the above-identified patent and that said Letters Patent is hereby corrected as shown below:

Title page, column 1, Related U.S. Application Data section (62), after "(62) Division of application No. 11/131,796, filed on May 18, 2005, now Pat. No. 7,391,569"

insert --which claims priority to Provisional application No. 60/639,990, filed December 29, 2004.--

Signed and Sealed this

Twenty-fourth Day of August, 2010

David J. Kappos
*Director of the United States Patent and Trademark Office*